(12) United States Patent
Kirkpatrick et al.

(10) Patent No.: US 8,103,137 B2
(45) Date of Patent: Jan. 24, 2012

(54) OPTICAL NETWORK FOR CLUSTER COMPUTING

(75) Inventors: Peter E. Kirkpatrick, San Francisco, CA (US); Jean-Marc Verdiell, Palo Alto, CA (US); Marc Epitaux, Sunnyvale, CA (US)

(73) Assignee: Fusion-IO, Inc., Salt Lake City, UT (US)

( * ) Notice: Subject to any disclaimer, the term of this patent is extended or adjusted under 35 U.S.C. 154(b) by 0 days.

(21) Appl. No.: 12/416,890

(22) Filed: Apr. 1, 2009

(65) Prior Publication Data

US 2010/0254652 A1    Oct. 7, 2010

(51) Int. Cl.
*G02B 6/26* (2006.01)
*H04J 14/00* (2006.01)

(52) U.S. Cl. .............................. 385/17; 398/45; 398/48
(58) Field of Classification Search .................. None
See application file for complete search history.

(56) References Cited

U.S. PATENT DOCUMENTS

| | | | | |
|---|---|---|---|---|
| 6,487,332 B1 * | 11/2002 | Rasala et al. | ..................... | 385/17 |
| 6,535,310 B1 * | 3/2003 | Rasala et al. | ..................... | 398/79 |
| 7,194,207 B2 * | 3/2007 | Rasala et al. | ..................... | 398/48 |
| 7,389,046 B1 * | 6/2008 | Tanaka et al. | ................... | 398/45 |

* cited by examiner

*Primary Examiner* — Tina Wong
(74) *Attorney, Agent, or Firm* — Stoel Rives LLP (57) ABSTRACT

Leaf switches and spine switches in a Clos network are interconnected by optical fibers. The network enables large numbers of servers or other apparatus to communicate with each other with minimal delay and minimal power consumption.

13 Claims, 7 Drawing Sheets

OPTICAL NETWORK FOR CLUSTER COMPUTING

TECHNICAL FIELD

The embodiments herein relate to optical networks and cluster computing, and in particular to switching networks for interconnecting any one of a large number of input nodes to any one of a large number of output nodes.

BACKGROUND

Crossbar switches are well known for providing arbitrary numbers of interconnections between input nodes and output nodes. Clos networks are often used for switching when the physical circuit switching needs exceeds the capacity of any reasonably feasible single crossbar switch. Clos networks employ stages of crossbar switches to interconnect the input nodes to the output nodes. An advantage of Clos networks is that the network can scale up in node count using crossbar switches of a fixed size, which is not possible in a single switch.

Clos network topology (sometimes also known as a 'Fat Tree' topology) is often used in high performance computing clusters. The Clos structure provides constant bisectional bandwidth (the bandwidth cut by a line drawn through the middle of the network) as node count increases, and also provides constant latency for expanding numbers of nodes in the cluster.

As typically used in interconnecting servers in a cluster computing system, Clos networks have what are known as "leaf" and "spine" stages. A leaf stage is directly coupled to a set of the input/output nodes, while a spine stage switches signals among the leaf stages, thereby enabling any leaf node to communicate with any other leaf node. In the hypothetical example of FIG. 8, one leaf stage 20 is composed of a series of line boards (1-6) having input nodes 22. Each line board includes two crossbar switches. The complete leaf stage 20 includes twelve crossbar switches—two switches per line board for each of the six boards. Leaf stage 30 is also composed of a series of line boards (7-12), each line board also including two crossbar switches. Stage 30 is connected to the output nodes 24.

Figure 8:
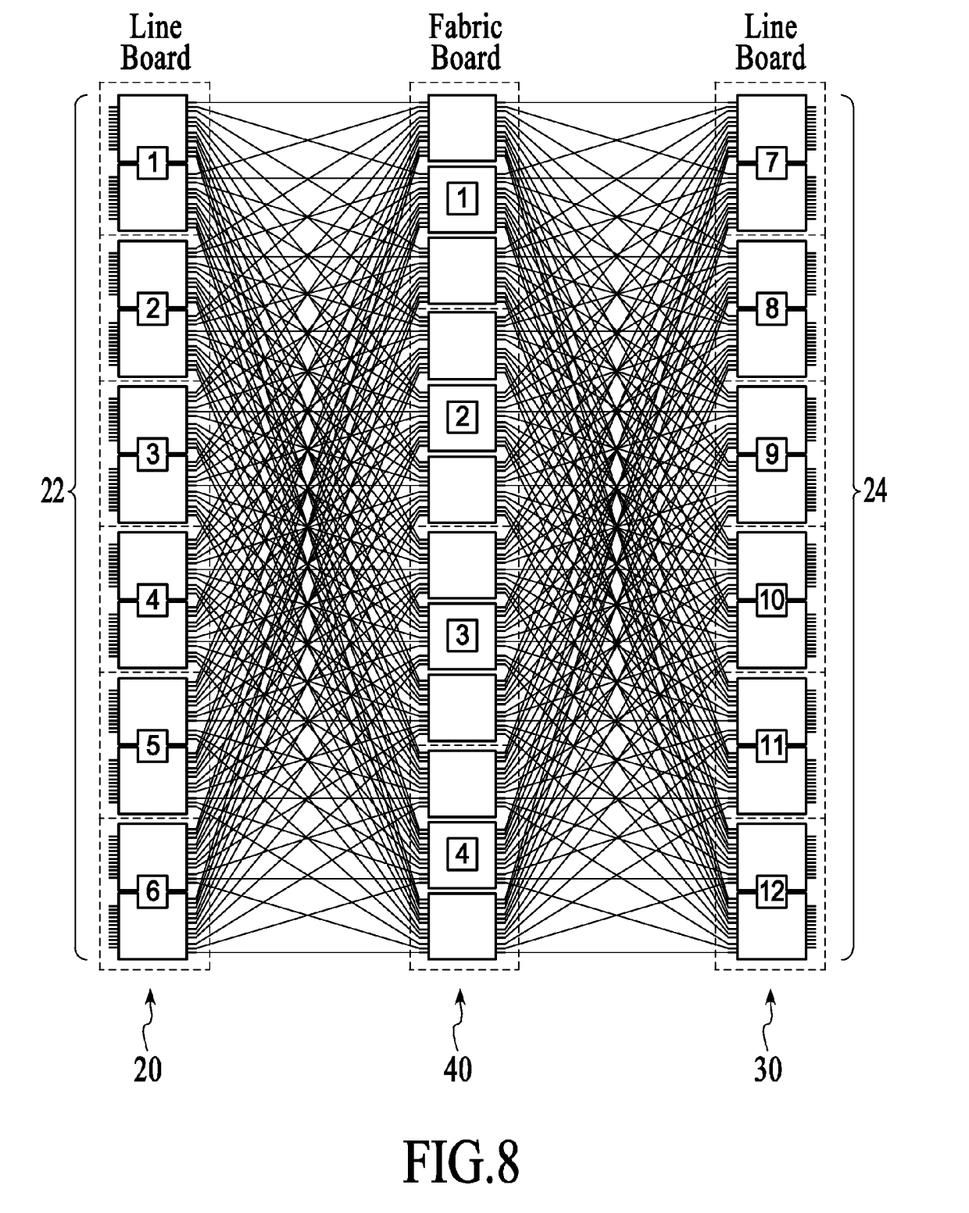
FIG. 8 is a conventional Clos network, under the prior art.

The spine stage 40 is composed of four fabric boards (1'-4') each including three crossbar switches. Each node 22 of a leaf stage 20 can be connected by the crossbar switch on the board to which it is coupled to any of the spine stage crossbar switches 1'-4'. Each crossbar switch on the spine stage 40 can be connected to the desired crossbar switch of leaf stage 30, and thereby to the desired node 24 on the right side of the illustration. In essence the structure allows every node 22 on a leaf stage 20 to be connected to any other node 24 on the other leaf stage 30. In a bidirectional system in which the nodes on the leaf stages 20 or 30 can be either input or output nodes, the signals can be routed from either leaf stage 20 to 30, or from stage 30 to 20.

Another Clos topology is known as a "folded" Clos network. In this topology the nodes coupled to stage 20 are bidirectional and only leaf stage 20 and spine stage 40 are required. (Stage 30 is eliminated.) The combination of stages 20 and 40 enable any signal arriving on any node 22 to be switched to any other node 22.

Conventional Clos topology systems use electrical crossbar switches with electrical interfaces and copper cabling. As evident from FIG. 1, an enormous number of copper cables are required to provide all of the interconnections among all of the nodes. At higher node counts, the leaf and spine switches can be combined in a proprietary chassis-based system which is connected to servers remotely through long reaches of copper cabling. The result of this configuration is that switches at the highest level of the system (spine switches) have very high node count and therefore have high cable density. The scalability of these systems is ultimately limited by the reach of the copper cabling, which at high transmission speeds is restricted.

These conventional systems can suffer from high cost of installation and management due to the complex configuration of copper cabling. The density of the system is limited by the connector density at the nodes of the leaf elements, as well as the high power required to drive high bandwidth signals through the relatively high signal loss cabling. The reliability is also reduced because the weight of the cables strains the connectors, resulting in faulty links which are difficult to isolate and replace.

DETAILED DESCRIPTION

Embodiments of a multi-node optical computing cluster are described below. The multi-node optical computing cluster, also referred to herein as a cluster or optical computing cluster, provides numerous computing nodes connected to leaf ports in a two-stage network with a folded Clos topology. The network includes any number of nodes (e.g., 48, 96, 288, etc.) and further scaling is possible under the embodiments herein, for example, clusters using the network structure of an embodiment can be built having thousands of nodes. Furthermore, the network has full bisectional bandwidth. The network elements are distributed among the computing nodes, thereby allowing for aggregation of the network uplinks from the leaf switches to the spine switches. The denser uplinks allow for simplified cabling, and the node links and uplink ports share a common physical layer for flexibility in configuration. Consequently, the cluster network structure of an embodiment is scalable while maintaining high performance, high density, and simplicity in the network cabling.

The multi-node optical computing cluster uses a passive optical interconnection unit, referred to herein as the Optical Cluster Fabric (OCF). The OCF is a matrix of optical fiber connections that internally form the Clos structure of the network and present grouped ports for external connections to leaf and spine switches. The OCF of an embodiment can be constructed from optical circuitry like, for example, Optical Flex circuitry available from Stratos Lightwave of Chicago, Ill., but the embodiment is not so limited. Connections between leaf nodes and spine switches are provided using parallel ribbon fiber cables, but the embodiment is not so limited. Network simplification is enabled by the grouping of network channels into a single port (e.g., 12 channels per port), which allows for increased cable and connector density and decreased cable count. On the switch side of the link, these grouped ports are enabled by parallel (multi-channel) optical transceivers. Due to the increased density of the connectors and ports of the parallel optical transceivers, the overall system density is increased. Thus, the OCF reduces the number of external cables in the system and simplifies the network structure from the user perspective.

In the OCF of an example embodiment, half of the network ports are grouped to match the width of the uplinks from the leaf switches. This width is generally one half of the radix (port count) of the leaf switch, but is not so limited. The other half of the ports is grouped to optimize connection to the spine switches. Internal to the OCF, the paths are divided from each leaf port to several of the spine ports, according to Clos structure. Division of the paths from each leaf switch to more than one spine switch provides the path diversity for a highly-available (HA) network. With one half of the OCF ports facing the leaves and one half of the ports facing the spine, full bisectional network bandwidth is achieved.

The multi-node optical computing cluster groups multiple optical connections or channels on one multi-fiber optical connector and a single fiber array to provide a relatively large number of Clos network connections with a single cable. Consequently, the cluster described herein houses the network structure inside an optical cluster fabric, with grouped connectors, thereby hiding the complex network topology from the user. By grouping connections on multi-fiber connectors and using ribbon cables, for example, the cabling presented to the user is simplified to include connecting relatively few cables, instead of building a conventional complex web of interconnected cables. Thus, the embodiments herein allow the user to establish the equivalent of dozens of individual copper connections all at once, and to arrange these connections in the proper Clos configuration without the need to understand the complexity of the routing.

The embodiments described herein provide a connector comprising a first set of ports and a second set of ports. An optical cluster fabric (OCF) is coupled between the first set of ports and the second set of ports. The OCF includes multiple channel sets coupled between the first set of ports and the second set of ports. In an embodiment, the OCF includes fiber optic lines forming the channel sets. Each channel set is connected between one port of the first set of ports and two or more ports of the second set of ports.

Further, the embodiments described herein provide a system comprising a connector coupled between multiple leaf switches and at least one spine switch. Each leaf switch has numerous first ports and second ports. The first ports of the leaf switch are configured for connection to external devices, and the second ports are configured for connection to the connector. The spine switch or switches each include numerous third ports configured for connection to the leaf switches via the connector. The connector includes a fourth set of ports coupled to the second ports of the leaf switches, a fifth set of ports coupled to the third ports of the spine switch, and an OCF. The OCF comprises multiple channel sets coupled between the fourth set of ports and the fifth set of ports. The OCF of an embodiment forms the channel sets using fiber optic lines. Each channel set is connected between one port of the fourth set of ports and at least two ports of the fifth set of ports.

The embodiments described herein provide an optical network for cluster computing applications. The network uses high density, low power optical links to provide a high bandwidth, low-latency and constant-latency network with relatively simplified, lightweight cabling and reduced system costs. The embodiments provide a network for interconnecting clusters of computing devices such as servers to provide large scale computing applications. The servers are connected to individual nodes of leaf switches which are in turn connected through an optical network to spine switches. The interconnection system enables any server to send or receive data from any other server with higher speeds, more flexibility, and lower power consumption than prior art interconnection networks. The interconnection system also enables higher node count networks with simpler cabling and higher density. These networks can be built and maintained at relatively lower cost than conventional interconnection systems.

In an embodiment, a group of servers, for example 12 servers, are connected to each of 12 input ports on a leaf switch. If four leaf switches are used, this enables the connection of 48 servers to the leaf switches, and from the leaf switches to spine switches. Two 24-port spine switches are connected to the 48 ports of the leaf switches. The arrangement enables any server to communicate with any other server by at most passing through two switches, one leaf switch and one spine switch. In cases where a server communicates with another server connected to the same leaf switch, then only one switch is required.

Figure 1:
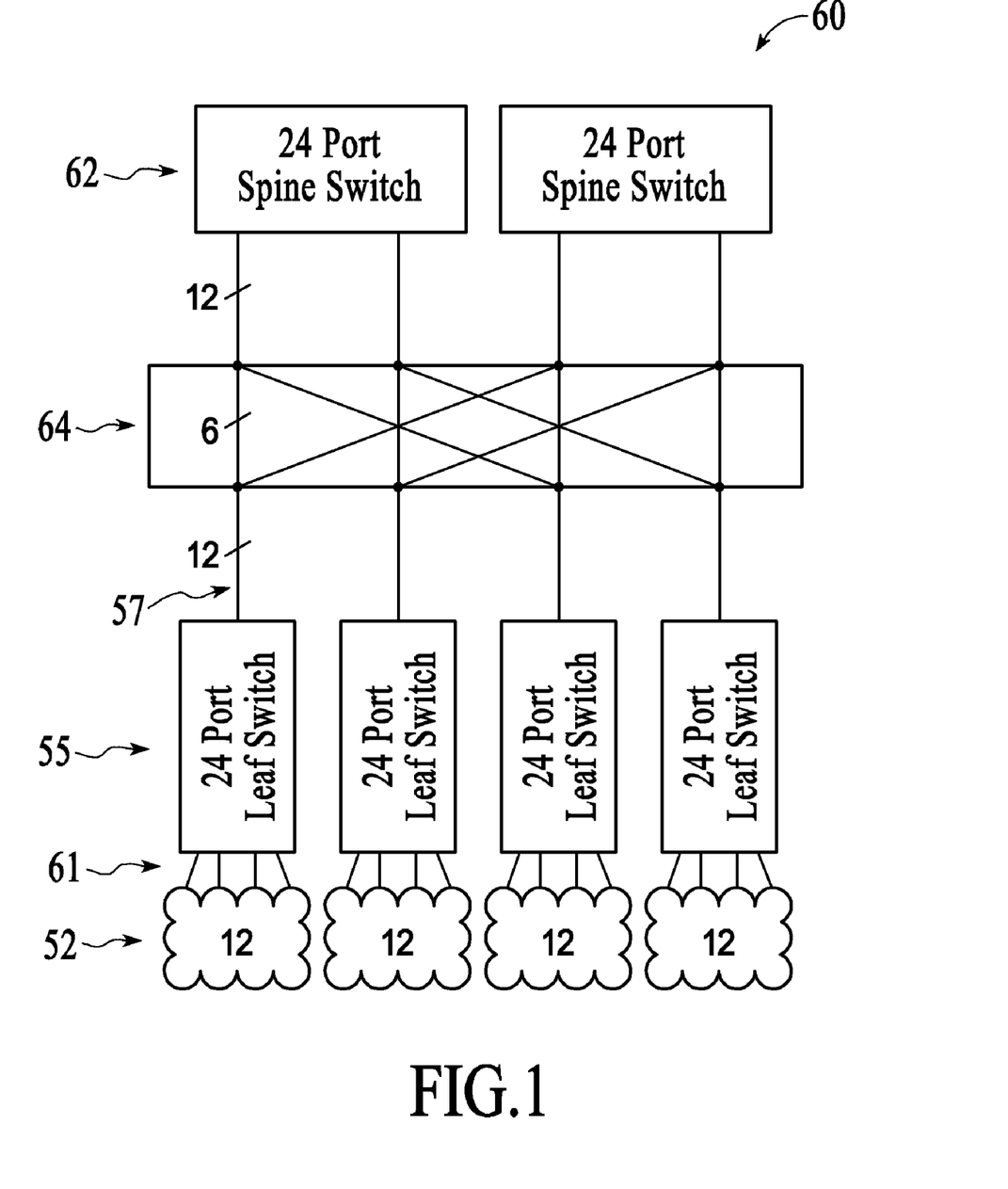
FIG. 1 is a 48-node computing cluster with optical interconnections, under an embodiment.

FIG. 1 is a 48-node computing cluster 60 with optical interconnections, under an embodiment. The cluster 60 of this system provides forty eight server nodes 52 connected at ten Gigabits per second (Gb/s) in a leaf-spine network with a folded Clos topology. The network has full bisectional bandwidth of 240 Gb/s, or 30 Gigabytes per second (GB/s). Of course, faster or slower link speeds are possible, resulting in higher or lower bisectional bandwidth in the interconnection network. The system is discussed in more detail below.

The computing nodes 52 are connected to the leaf switches 55 by fiber optic cables 61. This allows each of the servers 52 coupled to a single leaf switch 55 to communicate with each other without communicating through the spine switch. The leaf switches 55 are themselves interconnected with the spine switches 62, also by fiber optic cables 57. The configuration of the system allows for aggregation of the network uplinks from the leaf switches 55 to the spine switches 62. The denser uplinks from the leaf switches to the spine switches allows for relatively simplified cabling. The node links 61 and uplinks 57 share a common physical layer for flexibility in configuration. Of course the specific implementation of this cluster 60 is merely illustrative of the embodiments described herein. Other numbers of servers, leaf switches and spine switches may be used to implement the cluster. For example, a 288 node cluster would have a full bisectional bandwidth of 1.44 Tb/s (180 GB/s).

The cluster 60 shows the system implemented as a folded Clos network. The term "folded" refers to the circumstance that every server node can be both an input node receiving signals from the network, and an output node providing signals to the network. This folded Clos network is particularly useful for servers in which the servers only need to communicate with other local servers, in this case, servers in the same rack mounting. The network can be described as a (2,12,4) folded Clos network. The nomenclature is "(m,n,r)" where m represents the number of spine switches, n represents the number of I/O ports of each leaf switch, and r represents the number of leaf switches. For this implementation the single switch ASIC radix is 2n=24, and the link width between each leaf switch and each spine switch is 6 channels. The 48 server nodes 52 are shown in the two left racks and at the bottom of the block diagram. When each port has 10 Gb/s unidirectional bandwidth, the interconnection network provides 240 Gb/s of bisectional bandwidth with a maximum of three switch hops of latency. Each leaf switch 55 has a single 12-channel (120 Gb/s) uplink connection via fiber optic cable 57. The two spine switches 62 are shown on the top of the right rack, each with two 12-channel (120 Gb/s) nodes. The optical cluster fabric 64 is also illustrated, and will be described below. The complexity of the Clos network is hidden from the user, and simple, lightweight optical fibers provide connectivity.

Electrical signals provided at the output ports of the server nodes 52 are converted to optical signals for transmission to the leaf switches 55. Before being switched by the leaf switches 55 the signals are converted back to electrical signals. After being switched the signals are again converted to optical signals for transfer through the optical switching fabric. At the spine switches 62 the signals are again converted to electrical signals for switching, then reconverted to optical signals for return to the leaf switches 55. Those signals are converted back to electrical signals, again switched by the leaf switches, reconverted to optical signals and returned to the computing nodes for a final conversion. Of course, if optical switches are used in place of the electrical switches depicted in the cluster 60, fewer conversions are necessary. Each electrical—optical (EO) or optical—electrical conversion is achieved using optical transceivers (not shown).

The example cluster configuration 60 includes the optical cluster fabric 64. This optical cluster fabric 64 reduces the number of external cables in the system and simplifies the network structure from the user perspective. The optical cluster fabric 64 is provided by a matrix of optical fiber connections that internally form the Clos structure of the network and present grouped nodes for external connections to leaf 55 and spine 62 switches.

Figure 2:
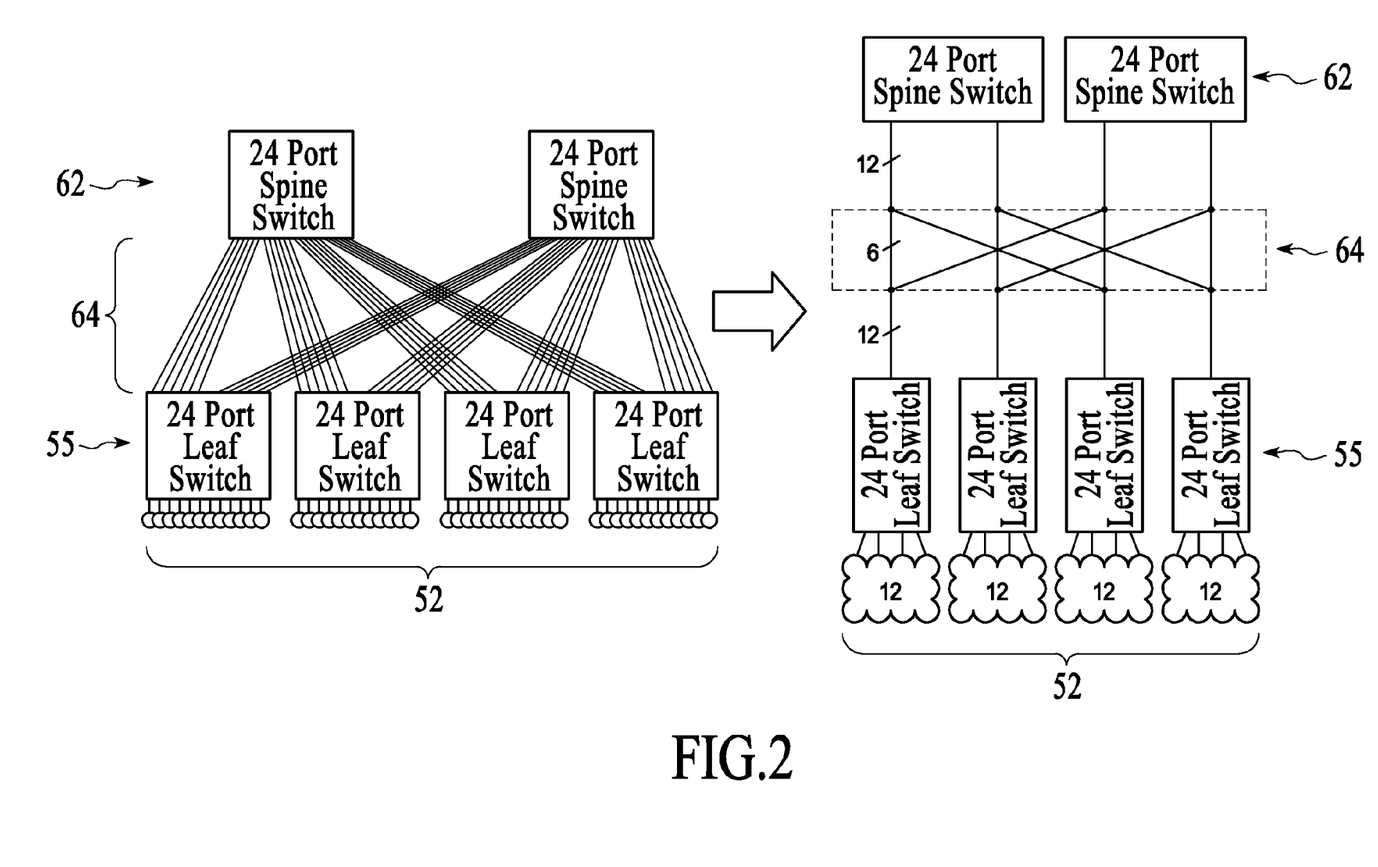
FIG. 2 shows the optical cluster fabric, under an embodiment.

FIG. 2 shows the optical cluster fabric 64, under an embodiment. For the optical cluster fabric 64, half of the network ports of each leaf switch 55 are connected to network nodes 52. One quarter of the network ports of each leaf switch 55 are grouped to connect to the one of the spine switches 62, while another one quarter are grouped to connect to the other of the spine switches 62. This width is generally one quarter of the radix of the leaf switch 55. Thus in this example, six channels are coupled to each leaf switch. With one half of the leaf switch ports facing the external world for connection to servers, and with the other half of the ports facing the spine switches 62, full bisectional network bandwidth is maintained. In an embodiment each connection of the optical cluster fabric 64 shown as a single line represents a pair of optical fibers, with one fiber used for communications from the leaf switch to the spine switch, and another fiber used for communications from the spine switch to the leaf switch. Of course a single fiber could be used for bidirectional communications if desired.

Figure 3:
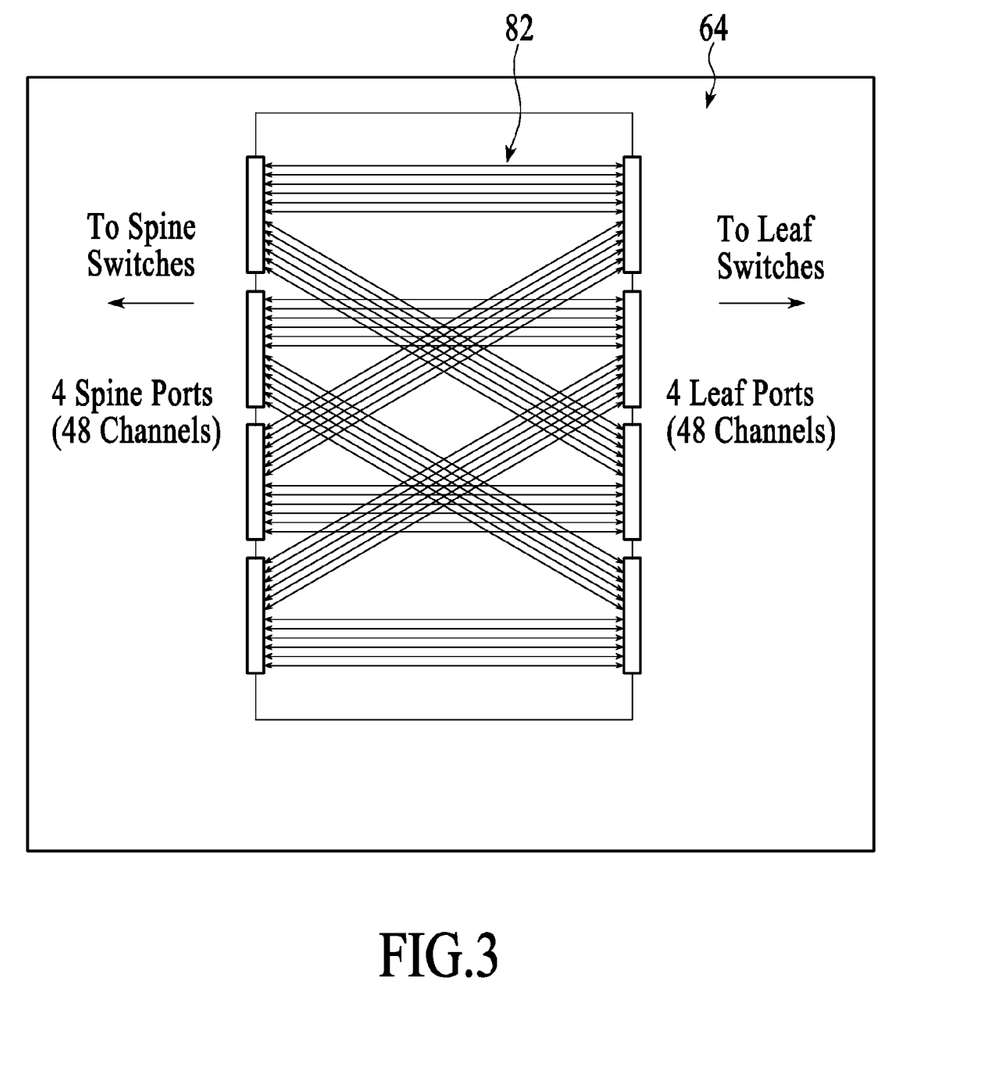
FIG. 3 is another depiction of the optical cluster fabric, under an embodiment.

FIG. 3 is another depiction of the optical cluster fabric 64, under an embodiment. This example provides a full Clos network structure for the forty eight node computing cluster 60 described above with reference to FIG. 1. Connections between the ports of the leaf switches and the ports of the spine switches are provided using parallel ribbon fiber cables 82. The arrow symbols on each end of each line represent a pair of optical fibers, one fiber for transmission from that port of the leaf switch to the spine switch, and another fiber for transmission from the spine switch to the leaf switch. Thus, a single line depiction in optical cluster fabric 64 represents a bidirectional communication path between the spine switch and the leaf switch. As shown, inside the fabric 64, the paths are divided from each leaf node to each spine node, according to the folded Clos structure. This arrangement provides the path diversity required for a network required to be "highly-available." A highly-available network is one in which has multiple paths through the network between any two nodes.

Figure 4:
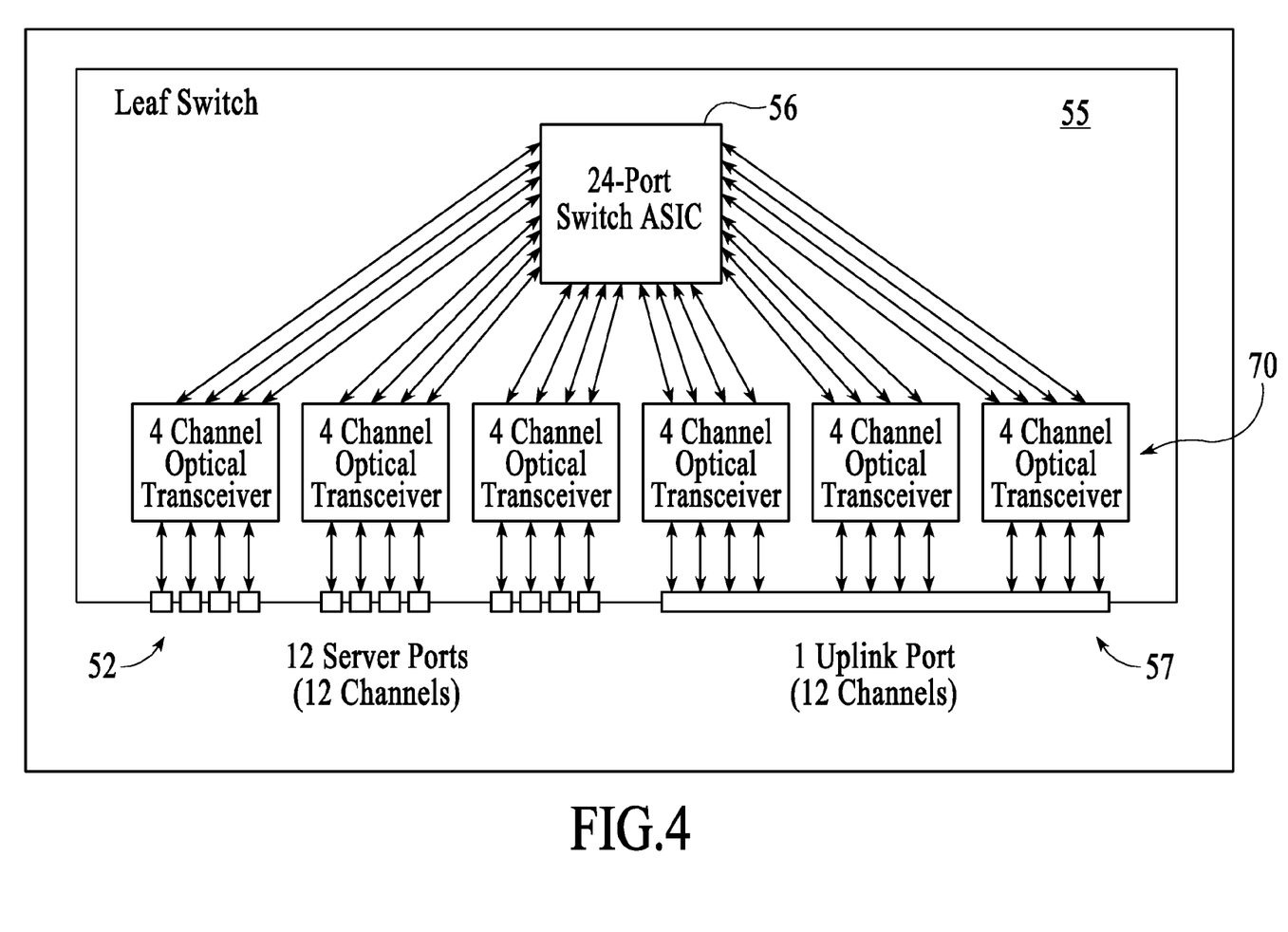
FIG. 4 is a leaf switch, under an embodiment.
Figure 5:
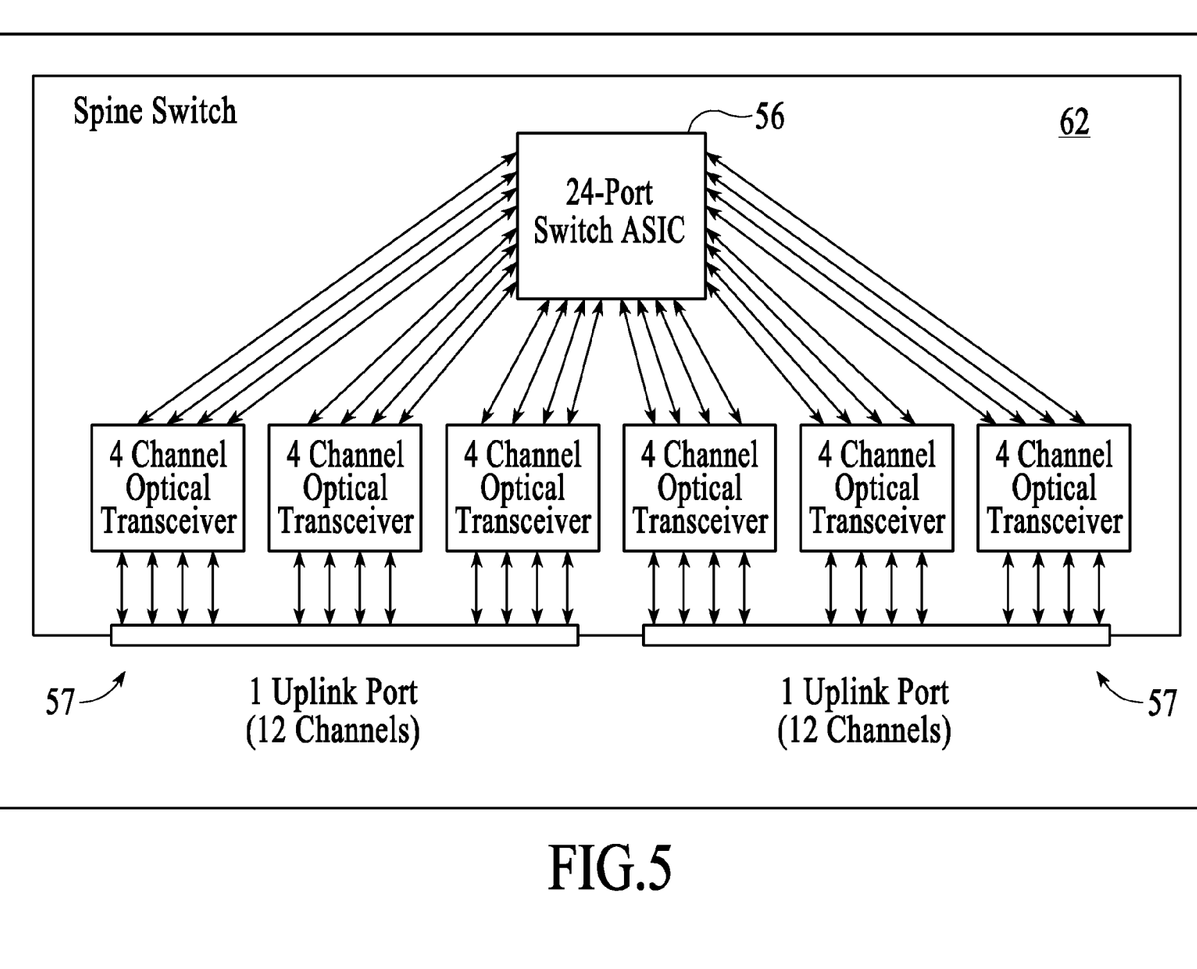
FIG. 5 is a spine switch, under an embodiment.

A number of different configurations of system packaging density are available using the embodiments described herein. As one example, FIG. 4 is a leaf switch 55, under an embodiment. In another example, FIG. 5 is a spine switch 62, under an embodiment. Each of the leaf switch 55 and the spine switch 62 is described in detail below.

In the leaf switch 55 example of an embodiment, with reference to FIG. 4, the rack-level packaging is chosen to correspond to the port count of the individual ASICs used for switching in the system. In the illustration 12 channels of connections 52 are provided to connect to the servers ("12 Server Ports") and 12 additional channels 57 are provided to connect to the uplink port and from there to the spine switch, but the embodiment is not so limited. Switching of the signals between the server ports 52 and the uplink port 57 is carried out by the switch ASIC 56. Four channel optical transceivers 70 convert the optical signals sent to the switch 56 into electrical signals, and convert the electrical signals from the switch 56 back into optical signals. As described above, each line with a double headed arrow represents a pair of optical fibers for communication in opposite directions, i.e. two optical lanes per line with arrows on each end.

A rack mounted unit containing the leaf switch 55 includes 12 port connectors for the servers, and a single connector 57 for the link to the spine switch. This 1RU form factor switch includes a 24 node packet switch ASIC 56 and optical transceivers with 12 individual full duplex node ports (i.e. 1 transceiver per port) on the left and an uplink node containing a total of 12 network channels on the right. Of course other multiple port configurations are possible. For example the server ports could provide various physical layer connectivity or the uplink connection could be configured as three four-channel ports. Higher density packaging is also possible, as the dense optical ports provide for additional front panel density, and compact electro-optical transceivers allow increased printed circuit board density.

In the spine switch 62 example of an embodiment, with reference to FIG. 5, each one of ports 57 with 12 channels (24 optical fibers) communicates between a leaf switch 55 (see FIG. 4) and the spine switch 62. Thus spine switch 62 is coupled to two leaf switches 55. Of course more or fewer switches may be employed, as described above. The 1RU spine switch 62 is a non-blocking 24 port crossbar with 24 channels grouped into two uplink ports 57 each containing 12 network channels. Four channel optical transceivers 70 convert the optical signals sent to the switch 56 into electrical signals, and convert the electrical signals from the switch 56 back into optical signals. As mentioned above, other port configurations are also possible, for example, three 4-channel ports can be used to provide a 12 channel uplink.

Reduced power dissipation has become an important aspect of large scale computing and networking systems. The increased cost of electrical energy, power density and cooling efficiency now encourage reducing system power consumption. The system described herein uses low power optical transceiver interfaces to reduce the input power required by the components, which reduces the cooling load required to maintain acceptable system temperatures.

The increased density of the connectors and nodes of the parallel optical transceivers can enable the overall system density to be increased. For example, the leaf switches 55 (FIG. 4) and spine switches 62 (FIG. 5) described above show high density ports to be enabled by use of parallel optical ports. As another example, compare the compact 120 Gb/s port (FIG. 5) with the 48 large coaxial copper cables that would be required in a conventional copper cable system. The result is that the 120 Gb/s port implemented according to the embodiments herein requires about the same space as a standard 10 Gb/s port. Because the cabling cross section and cable count are substantially reduced, the cabling density is improved. This aids in system installation, maintenance, reliability, cooling, and cost.

The embodiments described herein can provide cost savings, both in the cost of the system components and in the cost of operating and maintaining the system. The characteristics of the optical transceivers provide savings such as simpler electronic components, lower component costs, lower node count, and simplified mechanical and electromagnetic interference structures. At the system level, the use of optical cabling eliminates the cost of expensive high-bandwidth electrical cables, and the density of the optical links allows for reduced cabling count.

Figures 6, 7:
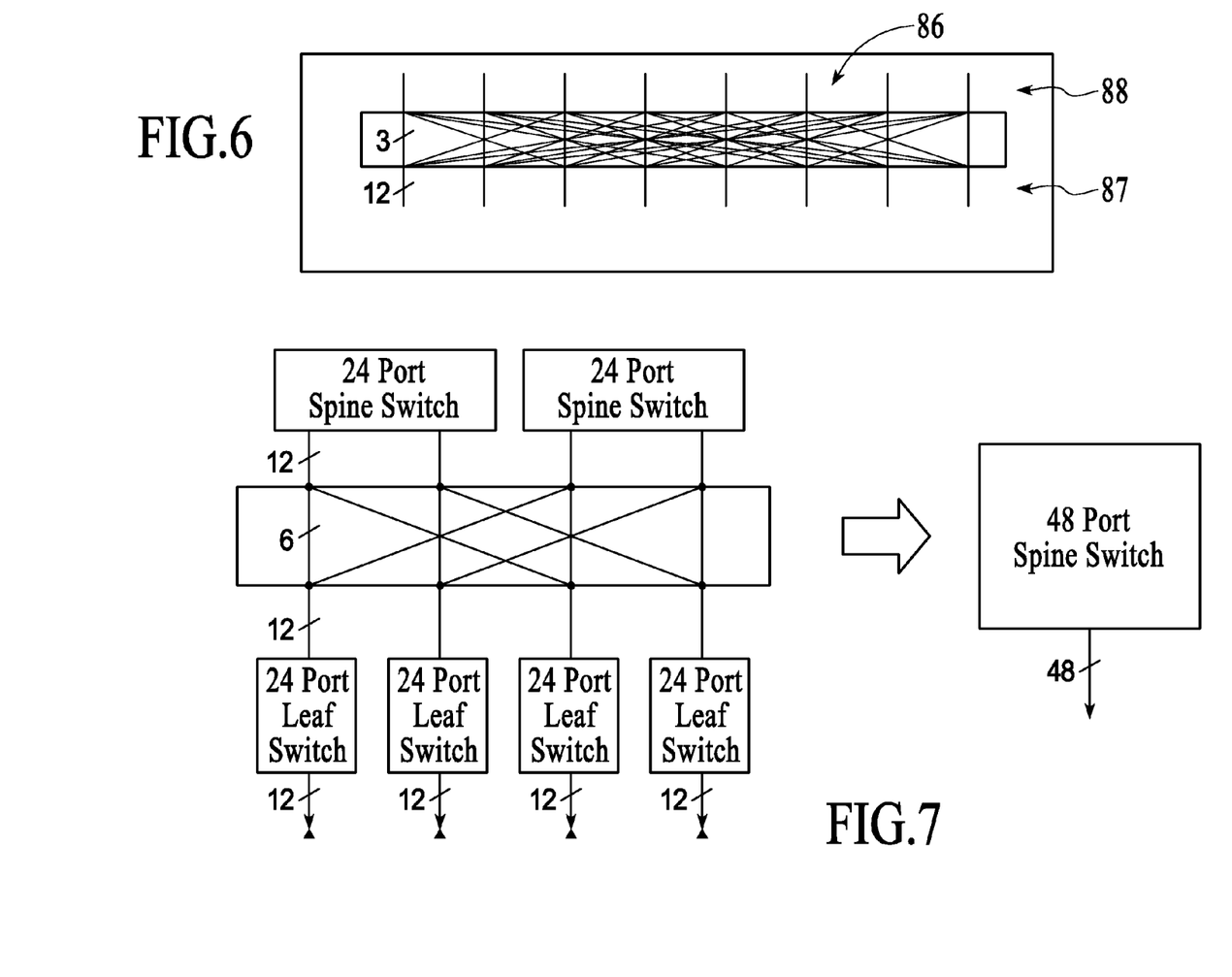
FIG. 6 is an optical cluster fabric in a 96-node computing cluster with optical interconnections, under an embodiment.
FIG. 7 is a computing cluster including two 24-port spine switches coupled to four 24-port leaf switches, under an embodiment.

As an example of scaling, FIG. 6 is an optical cluster fabric 86 in a 96-node computing cluster with optical interconnections, under an embodiment. The eight buses 87 each connect 12 ports to leaf switches. The eight buses 88 each connect 12 ports from the leaf switches to the spine switches. To further the scaling example, the use of a 24-port switch ASIC as described above scales the two tier network to 288 nodes (2n=24, 2n*n=288). To scale beyond 288 nodes, a three-tier network is used. For these systems, the second tier (spine switches) of switching is replaced with higher-radix switches, which are themselves constructed from two-tier Clos networks. For example, to build a 576-node cluster, radix-48 spine switches are required. When using radix-24 switch ASICs, the radix-48 spine switch is constructed using a (2,12, 4) Clos.

As another example of scaling, FIG. 7 is a computing cluster including two 24-port spine switches coupled to four 24-port leaf switches, under an embodiment. The computing cluster of this embodiment provides a relatively larger crossbar switch with radix 48. With 48 ports on each spine switch, the cluster size can now be doubled to 576 nodes. This scaling technique can be used to create clusters of up to 3,456 ports (2n=24, 2n*n*n=3456) when using radix-24 ASICs and three network tiers. Further scaling is possible with higher radix ASICs (such as 48-node switch ASICs). At these large cluster sizes, the physical distance across the cluster (over one hundred racks for 3456 nodes) demonstrates the importance of optical fiber links, where longer reaches are not a limitation.

The embodiments described herein include a connector comprising: a first set of ports; a second set of ports; and an optical cluster fabric (OCF) comprising a plurality of channel sets coupled between the first set of ports and the second set of ports, wherein the OCF comprises a plurality of fiber optic lines forming the plurality of channel sets, wherein each channel set of the plurality of channel sets is connected between one port of the first set of ports and at least two ports of the second set of ports.

The first set of ports of an embodiment presents grouped channels for connection to a first set of switches, wherein the second set of ports presents the grouped channels for connection to a second set of switches.

The OCF of an embodiment couples the plurality of channel sets of the first set of ports and the second set of ports according to a Clos network structure. The Clos network structure of an embodiment comprises a full bisectional bandwidth. The Clos network structure of an embodiment comprises a folded Clos network structure.

Each channel set of an embodiment includes twelve (12) channels.

Each channel of the channel set of an embodiment is coupled to an optical transceiver for converting between electrical and optical signals.

Each channel of the channel set of an embodiment comprises: a first optical fiber for conveying information from a first port of the first set of ports to a first port of the second set of ports; and a second optical fiber for conveying information from the first port of the second set of ports to the first port of the first set of ports.

The OCF of an embodiment comprises a plurality of parallel ribbon fiber cables.

The first set of ports and the second set of ports of an embodiment each include an equal number of ports.

The first set of ports of an embodiment includes twelve (12) channels per port and the second set of ports includes twelve (12) channels per port.

The first set of ports and the second set of ports of an embodiment each include four (4) ports.

The first set of ports and the second set of ports of an embodiment each include eight (8) ports.

The connector of an embodiment comprises: a leaf switch connected to each port of the first set of ports; and a spine switch connected to two ports of the second set of ports.

The connector of an embodiment comprises: a plurality of leaf switches, wherein each leaf switch of the plurality of leaf switches is connected to each port of the first set of ports; and at least one spine switch, wherein each port of the second set of ports is connected to a spine switch of the at least one spine switch. The plurality of leaf switches of an embodiment comprises r leaf switches. The first set of ports of an embodiment comprises n ports. The second set of ports of an embodiment comprises p ports. The at least one spine switch of an embodiment comprises r*n/p spine switches. A p/r fraction of ports of the first set of ports of an embodiment are coupled to each port of the second set of ports.

The embodiments described herein include a connector comprising: a plurality of leaf ports; a plurality of spine ports; and an optical cluster fabric (OCF) comprising a plurality of parallel ribbon fiber cables forming a plurality of channels coupling the plurality of leaf ports to the plurality of spine ports according to a Clos network structure.

The plurality of leaf ports of an embodiment presents grouped channels for connection to a set of leaf switches, wherein the plurality of spine ports presents the grouped channels for connection to a set of spine switches.

The Clos network structure of an embodiment comprises a full bisectional bandwidth.

The Clos network structure of an embodiment comprises a folded Clos network structure.

Each channel of the plurality of channels of an embodiment comprises: a first optical fiber for conveying information from a first port of the plurality of leaf ports to a first port of the plurality of spine ports; a second optical fiber for conveying information from the first port of the plurality of spine ports to the first port of the plurality of leaf ports.

The embodiments described herein include a connector comprising: a plurality of leaf ports, wherein each leaf port of the plurality of leaf ports terminates in a leaf port connector; a plurality of spine ports, wherein each spine port of the plurality of spine ports terminates in a spine port connector; and an optical cluster fabric (OCF) comprising a plurality of fiber optic ribbon cables coupled between the plurality of leaf ports and the plurality of spine ports, wherein the OCF couples a plurality of channels of each leaf port among at least two spine ports.

The embodiments described herein include a system comprising: a plurality of leaf switches; a plurality of leaf ports, wherein each leaf port of the plurality of leaf ports is connected to a leaf switch; at least one spine switch; a plurality of spine ports, wherein each spine port of the plurality of spine ports is connected to a spine switch; and an optical cluster fabric (OCF) comprising a plurality of channel sets connecting the plurality of leaf ports to the plurality of spine ports according to a Clos network structure.

The OCF of an embodiment comprises a plurality of fiber optic lines forming the plurality of channel sets, wherein each channel set of the plurality of channel sets is connected between one port of the first set of ports and at least two ports of the second set of ports.

The Clos network structure of an embodiment comprises a full bisectional bandwidth.

The Clos network structure of an embodiment comprises a folded Clos network structure.

The plurality of leaf switches of an embodiment comprises r leaf switches. The plurality of leaf ports of an embodiment comprises n ports. The plurality of spine ports of an embodiment comprises p ports. The at least one spine switch of an embodiment comprises r*n/p spine switches. A p/r fraction of the leaf ports of an embodiment are coupled to each spine port.

Each channel of the plurality of channel sets of an embodiment includes: a first optical fiber for transferring information from a leaf switch to a spine switch; and a second optical fiber for transferring information from the spine switch to the leaf switch.

The embodiments described herein include a system comprising: a plurality of leaf switches, each having a plurality of first ports for being connected to external apparatus, and having a plurality of second ports; at least one spine switch having a plurality of third ports for being connected to ones of the plurality of second ports of the leaf switches; and a connector coupled between the second ports and the third ports, the connector comprising a fourth set of ports coupled to the plurality of second ports, a fifth set of ports coupled to the plurality of third ports, and an optical cluster fabric (OCF) comprising a plurality of channel sets coupled between the fourth set of ports and the fifth set of ports, wherein the OCF comprises a plurality of fiber optic lines forming the plurality of channel sets, wherein each channel set of the plurality of channel sets is connected between one port of the fourth set of ports and at least two ports of the fifth set of ports.

The first set of ports of an embodiment presents grouped channels for connection to the plurality of leaf switches, wherein the second set of ports presents the grouped channels for connection to the at least one spine switch.

The OCF of an embodiment couples the plurality of channel sets of the first set of ports and the second set of ports according to a Clos network structure.

The Clos network structure of an embodiment comprises a full bisectional bandwidth.

The Clos network structure of an embodiment comprises a folded Clos network structure.

The plurality of leaf switches of an embodiment comprises r leaf switches. The plurality of first ports and second ports of an embodiment each comprise n ports. The plurality of third ports of an embodiment comprises p ports. The at least one spine switch of an embodiment comprises r*n/p spine switches. Each leaf switch of an embodiment has a p/r fraction of its second ports coupled to each spine switch.

Each channel of the channel set of an embodiment includes: a first optical fiber for conveying information from a leaf switch to a spine switch; and a second optical fiber for conveying information from the spine switch to the leaf switch.

Each channel of an embodiment includes an optical transceiver for converting between electrical and optical signals.

Each channel set of an embodiment includes twelve (12) channels.

Each channel of the channel set of an embodiment includes an optical transceiver for converting between electrical and optical signals.

Each channel of the channel set comprises: a first optical fiber for conveying information from a first port of the first set of ports to a first port of the second set of ports; and a second optical fiber for conveying information from the first port of the second set of ports to the first port of the first set of ports.

The external apparatus of an embodiment comprises a computer server, and there is a separate computer server for each of the first ports.

The embodiments described herein include a system comprising: first, second, third and fourth leaf switches, each leaf switch having 2n ports, a first number n of the 2n ports being adapted to be coupled to external apparatus and a second number n of the 2n ports being available for connection to provide 4n ports available for connection; first and second spine switches each having p ports for a total of 2p ports; and an optical network coupled between the 4n ports of the leaf switches and the 2p ports of the spine switches, the optical network comprising a first set of ports coupled to the leaf switches, a second set of ports coupled to the spine switches, and an optical cluster fabric (OCF) comprising a plurality of channel sets coupled between the first set of ports and the second set of ports, wherein the OCF comprises a plurality of fiber optic lines forming the plurality of channel sets, wherein each channel set of the plurality of channel sets is connected between one port of the first set of ports and at least two ports of the second set of ports.

The variable n of an embodiment is 12 and p is 24.

Each port of an embodiment is adapted to be coupled to a pair of the plurality of fiber optic lines, one for transmission of information to the port and one for transmission of information away from the port.

The embodiments described herein include a network for providing interconnections in a system having a plurality r of leaf switches, each leaf switch having a first plurality n of first ports for being connected to external apparatus and having a second plurality n of second ports, and having a third plurality of spine switches each having a fourth plurality p of third ports, where the fourth plurality of spine switches is r*n/p, the network comprising a set of optical channels connecting p/r fraction of the second plurality n of second ports of each leaf switch to each one of the fourth plurality of spine switches, wherein the set of optical channels comprises a plurality of fiber optic lines.

The set of optical channels of an embodiment connects the p/r fraction of the second plurality n of second ports of each leaf switch to each one of the fourth plurality of spine switches according to a Clos network structure.

The Clos network structure of an embodiment comprises a full bisectional bandwidth.

The Clos network structure of an embodiment comprises a folded Clos network structure.

Each optical channel of an embodiment includes a first optical transceiver for converting between electrical and optical signals at one end and a second optical transceiver for converting between electrical and optical signals at another end.

The optical transceivers of an embodiment are grouped together into units and the optical fibers are grouped together in bundles having a number of optical fibers corresponding to the number of optical transceivers in each unit.

The number of optical transceivers of an embodiment grouped together into a unit is evenly divisible into the first plurality n.

Each optical channel of an embodiment includes two optical fibers, with a first optical fiber for transmitting information in one direction and a second optical fiber for transmitting information in an opposite direction.

The variable r of an embodiment is 4, n is 12, and p is 24.

The variable r of an embodiment is 8, n is 12, and p is 24.

Networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The optical computing cluster can be a component of a single system, multiple systems, and/or geographically separate systems. The optical computing cluster can also be a subcomponent or subsystem of a single system, multiple systems, and/or geographically separate systems. The optical computing cluster can be coupled to one or more other components (not shown) of a host system or a system coupled to the host system.

One or more components of the optical computing cluster and/or a corresponding system or application to which the optical computing cluster is coupled or connected include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the optical computing cluster can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the optical computing cluster and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the optical computing cluster and corresponding systems and methods include: microcontrollers with memory (such as electronically erasable programmable read only memory (EE-PROM)), embedded microprocessors, firmware, software, etc. Furthermore, aspects of the optical computing cluster and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the optical computing cluster and corresponding systems and methods is not intended to be exhaustive or to limit the systems and methods to the precise forms disclosed. While specific embodiments of, and examples for, the optical computing cluster and corresponding systems and methods are described herein for illustrative purposes, various equivalent modifications are possible within the scope of the systems and methods, as those skilled in the relevant art will recognize. The teachings of the optical computing cluster and corresponding systems and methods provided herein can be applied to other systems and methods, not only for the systems and methods described above.

The elements and acts of the various embodiments described above can be combined to provide further embodiments. These and other changes can be made to the optical computing cluster and corresponding systems and methods in light of the above detailed description.

In general, in the following claims, the terms used should not be construed to limit the optical computing cluster and corresponding systems and methods to the specific embodiments disclosed in the specification and the claims, but should be construed to include all systems that operate under the claims. Accordingly, the optical computing cluster and corresponding systems and methods is not limited by the disclosure, but instead the scope is to be determined entirely by the claims. While certain aspects of the optical computing cluster and corresponding systems and methods are presented below in certain claim forms, the inventors contemplate the various aspects of the optical computing cluster and corresponding systems and methods in any number of claim forms. Accordingly, the inventors reserve the right to add additional claims after filing the application to pursue such additional claim forms for other aspects of the optical computing cluster and corresponding systems and methods.

What is claimed is:

1. A connector comprising:
   a first set of ports;
   a plurality of leaf switches, wherein each leaf switch of the plurality of leaf switches is connected to each port of the first set of ports;
   a second set of ports;
   at least one spine switch, wherein each port of the second set of ports is connected to a spine switch of the at least one spine switch, and wherein the plurality of leaf switches comprises r leaf switches, the first set of ports comprises n ports, the second set of ports comprises p ports, the at least one spine switch comprises r*n/p spine switches, and a p/r fraction of ports of the first set of ports are coupled to each port of the second set of ports; and
   an optical cluster fabric (OCF) comprising a plurality of channel sets coupled between the first set of ports and the second set of ports, wherein the OCF comprises a plurality of fiber optic lines forming the plurality of channel sets, wherein each channel set of the plurality of channel sets is connected between one port of the first set of ports and at least two ports of the second set of ports, wherein the first set of ports presents grouped channels for connection to a first set of switches, wherein the second set of ports presents the grouped channels for connection to a second set of switches, wherein each port of the first and second set of ports comprises a plurality of channels, wherein each channel comprises a plurality of fiber optic connections.

2. The connector of claim 1, wherein the OCF couples the plurality of channel sets of the first set of ports and the second set of ports according to a Clos network structure.

3. The connector of claim 2, wherein the Clos network structure comprises a full bisectional bandwidth.

4. The connector of claim 2, wherein the Clos network structure comprises a folded Clos network structure.

5. The connector of claim 1, wherein each channel set includes twelve (12) channels.

6. The connector of claim 1, wherein each channel of the channel set is coupled to an optical transceiver for converting between electrical and optical signals.

7. The connector of claim 1, wherein each channel of the channel set comprises:
   a first optical fiber for conveying information from a first port of the first set of ports to a first port of the second set of ports; and
   a second optical fiber for conveying information from the first port of the second set of ports to the first port of the first set of ports.

8. The connector of claim 1, wherein the OCF comprises a plurality of parallel ribbon fiber cables.

9. The connector of claim 1, wherein the first set of ports and the second set of ports each include an equal number of ports.

10. The connector of claim 1, wherein the first set of ports includes twelve (12) channels per port and the second set of ports includes twelve (12) channels per port.

11. The connector of claim 1, wherein the first set of ports and the second set of ports each include four (4) ports.

12. The connector of claim 1, wherein the first set of ports and the second set of ports each include eight (8) ports.

13. The connector of claim 1, comprising:
   a leaf switch connected to each port of the first set of ports; and
   a spine switch connected to two ports of the second set of ports.

* * * * *